United States Patent [19]

Bradley

[11] Patent Number: 4,535,016

[45] Date of Patent: Aug. 13, 1985

[54] INSULATING ARTICLE AND METHOD OF MAKING SAME

[76] Inventor: John M. Bradley, Box 327, Manchester, Mass. 01944

[21] Appl. No.: 633,042

[22] Filed: Jul. 20, 1984

Related U.S. Application Data

[63] Continuation-in-part of Ser. No. 530,895, Sep. 12, 1983, abandoned.

[51] Int. Cl.[3] .................... B32B 1/04

[52] U.S. Cl. .................... 428/74; 53/452; 427/387; 428/240; 428/283; 428/237; 428/253; 428/331; 428/446; 428/920

[58] Field of Search .................... 53/452; 428/74.233, 428/237, 253, 283, 331, 920, 323, 446, 240; 427/344, 387

[56] References Cited

U.S. PATENT DOCUMENTS

| | | | |
|---|---|---|---|
| 2,959,793 | 11/1960 | Bell et al. | 428/237 |
| 3,931,428 | 1/1976 | Reich | 428/331 |
| 4,248,927 | 2/1981 | Liebman | 428/300 |

FOREIGN PATENT DOCUMENTS

| | | | |
|---|---|---|---|
| 987104 | 4/1976 | Canada . | |
| 2653043 | 5/1978 | Fed. Rep. of Germany | 428/74 |

*Primary Examiner*—James J. Bell
*Attorney, Agent, or Firm*—Russell, Robert B.

[57] ABSTRACT

An insulating material for an insulated article and a method for making same are provided. The article comprises goose down or similar insulation, together with an excess of submicron finely divided hydrophobic particulate metal or metalloid oxide pigment contained in an envelope. The envelope is tightly woven (or similar) fabric which is permeable to gas, but retains the pigment. An envelope having good breathability and, hence, dryability is provided together with improved insulation and resistence to water penetration and absorption. In addition, the envelope may be compressed when not in use and still recover its loft thereafter when the pressure is released.

10 Claims, No Drawings

INSULATING ARTICLE AND METHOD OF MAKING SAME

FIELD OF THE INVENTION

This invention is a continuation-in-part of my presently pending U.S. patent application Ser. No. 530,895 filed on Sept. 12, 1983 now abandoned.

It relates to contained insulating materials for coverings and more particularly to articles such as mittens, jackets, shoes, hats, tents, sleeping bags, pillows, comforters, and the like, and to the process for making same. The invention is useful for insulating any object which needs both insulation and air circulation.

BACKGROUND OF THE INVENTION

Goose down and eider down are generally regarded as the best materials available for insulating coverings. This is largely because their bulk densities are extremely low (i.e., about 0.2 lbs./ft.$^3$), and they are sufficiently porous to allow the escape of water vapor from the surface of the body. This ability to "breathe" is an extremely important feature in the context of body coverings, because it allows the escape of perspiration which otherwise would accumulate and detract from both insulation and comfort if the covering were totally impervious. Thus, while some materials, such as closed-cell plastic foams containing high molecular weight gases entrapped in the foam cells, have greater insulating power per unit of thickness than goose or eider down, they are heavier and are not suitable for body coverings because they do not "breathe".

Goose and eider down, however, have several serious drawbacks. They are very expensive (i.e., about $24/lb. wholesale). Also, they totally lose effectiveness when they become wet, and, once wet, they are extremely difficult to dry. They could, of course, be packed in a totally waterproof envelope, but, if that were done, the required breathability of the covering would be lost. If the envelope were totally impermeable to water and air, it would then be impossible to pack the down-insulated envelope into a small volume when not in use. The compressibility of goose down when not in use, accompanied by recovery of loft when the pressure is released, is a very important property of goose down.

Accordingly, a primary object of the invention is to provide improved insulation for items such as body coverings which, at one and the same time, enjoys the insulating and breathability and compressibility advantages of goose or eider down, but substantially overcomes the disadvantages of wetability thereof. An object is to provide a process for making such articles. An additional object is to improve the insulating power of articles employing water fowl down without increasing the bulk density when they are being used. A further object is to accomplish the foregoing without increasing the discomfort of the user. Still another object is to provide an insulating article according to the above objects which also is adapted to be compressed when not in use.

BRIEF DESCRIPTION OF THE INVENTION

The present invention stems from the discovery by the present inventor that mixing goose down with finely divided hydrophobic particulate metal or metalloid oxide pigment in an amount substantially in excess of that required to cover the down fibers with a monolayer of particles touching each other over the entire surface of the fibers, causes, contrary to expectation, an increase in insulating power per unit of weight in a given volume. This increase in insulating power appears to be unrelated to the action of the pigment in increasing the hydrophobic character of the down.

The present invention combines these discoveries in the following way. An envelope to retain the insulation is made of a permeable, tightly woven, or tightly knitted cloth or any other water vapor permeable material which is also capable of retaining the pigment, suitably contoured for the desired article. The envelope is filled with water fowl down (or other fine fibrous insulation). Also admixed with the down is the hydrophobic pigment in quantity sufficient to cover the surface of the down completely, and, in addition, between about 3% up to 50% by weight of excess hydrophobic pigment.

An important feature of the invention is that the down is strongly protected against wetting, not only by the hydrophobic pigment on its surface, but also by the excess of pigment permeating the entire envelope and penetrating into all interstices on the inside surfaces of the envelope. Due to the woven (or similar) nature of the material of the envelope, the envelope breathes, but due to the excess of hydrophobic pigment, the down and the inside wall of the envelope are continuously recoated with pigment as the article is flexed during use, and therefore, the envelope remains resistant to the penetration of liquid water. The down also is, therefore, resistive to water penetration and absorption without interfering with the water vapor permeability of the envelope. In addition, although the envelope breathes, its weave is sufficiently close to retain the hydrophobic pigment effectively within the envelope and avoid any substantial contact between the body of the user and the pigment. Also, due to the ability of the envelope to breathe, it may be readily compressed when not in use, but yet recover its loft thereafter when the pressure is released. A further feature is that the thermal conductivity of the down treated in accordance with this invention is reduced. For example, a mixture of two parts by weight of down with one part by weight of the pigment will have 7.3% lower thermal conductivity than that of untreated down of the same weight (i.e., weight of down plus pigment) in an envelope of the same volume.

DETAILED DESCRIPTION OF THE INVENTION

The present invention is suitable for articles such as jackets, trousers, sleeping bags, mittens, shoes, shirts, socks, coats, hats, blankets, pillows, comforters, etc. It pertains primarily to the insulating material but also to the combination of the material and the envelope and can have any shape suitable for the intended end use. For this reason, it is considered that a drawing would contribute little to an understanding of the invention.

The basic component of the invention is the treated insulating material. In addition, a suitable contoured envelope is employed made of material that is permeable to water vapor but substantially impermeable to the below-described hydrophobic pigment. Preferably, it is made of tightly woven or tightly knitted natural or synthetic yarns or a combination of them, or, in areas such as the palms of mittens where a higher coefficient of friction is desirable, leather serves the purpose. Portions of the envelope may be totally impervious. The envelope is filled with fine fibrous insulating material such as goose down (or downs of swan, duck, chicken or other fine insulating fibers) together with between about 3% to 50% by weight of a finely divided hydrophobic particulate metal oxide or metalloid oxide pigment in excess of the amount of pigment required to cover all surfaces of said insulating material with a mono-layer of said pigment particles touching each other. The pigment may be such as the submicron amorphous hydrophobic silica pigment sold by the Cabot Corporation under the designation "Cab-O-Sil N70-TS". Another suitable metalloid oxide pigment is the hydrophobic silica formerly sold by the Cabot Corporation under the designation "Silanox". Still another is the hydrophobic silica sold by Tulco, Inc. under the designation "Tulanox". A further suitable silica pigment is sold by Degussa under the designation "Aerosil R972". Other metal oxide (e.g., alumina or iron oxide) and metalloid oxide (e.g., germanium) finely divided pigments treated to render them highly hydrophobic may also be employed including, for example, an alumina sold by Degussa under the designation "Alon-C" and aftertreated to render it highly hydrophobic, which aftertreatment can be chemical as by heating in the presence of substances which form hydrophobic surface methyl groups on the pigment, or by intimate mechanical admixture of hydrophobic substances such as parafin. The preferred hydrophobic pigment providing maximum performance according to the present invention is the Cab-O-Sil N70-TS mentioned above.

Other fine insulating fibers may include a fine fibrous polyethylene sold by 3M under the designation "Thinsulate".

The mixing of the pigment and the down (or other insulating fiber) is done by placing them together in a container and tumbling them.

Since less than 1% by weight of the hydrophobic pigment is theoretically required to cover the surface of the down, there is a considerable excess of it in the envelope. This excess strongly protects both the envelope and the down from water penetration and absorption while at the same time increasing the insulating value of the down, but not imparing the breathability of the envelope, or increasing the bulk density of the insulation. Further, even if water happens to penetrate into the envelope despite the protection of the hydrophobic material, the down can be dried out thereafter much more readily than the untreated down. In addition, the composite article can be laundered repetitively and still retain significant resistance to water penetration and absorption.

It has also been found that a thermal insulation test specimen made in accordance with this invention and containing 33% by weight of pigment has 7.3% more insulating power than an untreated goose down filled specimen having the same density and weight per unit area of insulation. This is contrary to expectation because untreated goose down (and eider down) have always been considered to have higher thermal insulating power for a given weight than any other material.

The invention is highly significant economically because it provides better insulation and water repellency at lower cost. For example, the cost of Cab-O-Sil N70-TS is around $4/lb., whereas the down costs around $24/lb. Thus, one pound of treated down (0.67 lb. down and 0.33 lb. pigment) having a 7.3% better insulating power than one pound of untreated down, will cost only $17.40, a saving of 27½% of the cost of down (disregarding the cost of mixing the down and pigment). In addition, since the treated down has substantially greater resistance to water absorption, and greater insulating power even when wet, than untreated down, the extra expense of materials for rendering the envelopes waterproof (yet water vapor permeable) such as "Gortex" may be avoided by using down treated according to the present invention.

The form of fumed silica pigment which has been coated with silicone treating fluid to provide polymethylsilyl groups on the surface thereof, i.e., Cab-O-Sil N70-TS, is preferred because it is less dusty, and disperses more easily than other conventional hydrophobic fumed silica pigments. However, other forms of finely divided hydrophobic particulate metal oxide or metalloid oxide pigments in amounts substantially in excess of that required to cover the fibers will work and fall within the broad scope of the invention.

Having described a preferred embodiment, it will now be apparent to those skilled in the art that various modifications can be made. For example, the fibrous insulating material can be other types of feathers and other fine fibers. It is, therefore, not intended to confine the invention to the precise form herein shown, but rather to limit only the terms of the appended claims.

I claim:

1. An insulating article comprising:

(a) a sealed permeable-to-gas envelope;

(b) insulating material substantially filling said envelope comprising a fine fibrous insulating material;

(c) finely divided hydrophobic particulate metal oxide said insulating material in said envelop; or metalloid oxide pigment intimately admixed with (d) a substantial excess of said pigment in said envelope beyond that required substantially completely to cover all surfaces of said material with a monolayer of said pigment particles touching each other; and (e) said envelope adapted substantially to retain said pigment within said envelope.

2. The article defined in claim 1 further characterized by: a substantial portion only of said envelope of element (a) comprising a porous material suitable for the passage of water vapor and gas but not the passage of said pigment.

3. The article defined in claim 1 further characterized by: said insulating material of element (b) selected from the group consisting goose, swan, duck, and chicken down.

4. The article defined in claim 1 further characterized by: said pigment of element (c) comprising a submicron fumed silica pigment treated to render it highly hydrophobic.

5. The article defined in claim 1 further characterized by: the excess of pigment of element (d) being between about 3% and 50% by weight of the fibrous insulating material and pigment mixture.

6. The article defined in claim 1 further characterized by: the pigment of element (c) comprising a fumed silica treated with a silicone fluid to form polymethylsilyl groups on the surface of said silica.

7. A process for manufacturing an insulated article comprising the steps of:

(a) mixing a quantity of a fine fibrous insulating material with a finely divided hydrophobic particulate metal oxide or metalloid oxide pigment in an amount substantially in excess of the amount required to provide a monolayer of the particles of said pigment touching each other over the entire surface of the fibers of said insulating material;

(b) selecting a finely porous sheet of material the pores of which permit the passage of gas but are small enough substantially to resist the passage therethrough of said pigment;

(c) forming an envelope of said sheet material;

(d) filling said envelope with a measured quantity of the mixture; and (e) completing the closure of said envelope.

8. The process of claim 7 further characterized by: the fibrous insulating material selected from the group consisting the down and feathers.

9. The process of claim 7 further characterized by: the pigment comprising a fumed silica aftertreated to render it hydrophobic.

10. The process of claim 7 further characterized by: the pigment comprising a fumed silica treated with a silicone fluid to form polymethylsilyl groups on the surface of said silica.

* * * * *

UNITED STATES PATENT AND TRADEMARK OFFICE

CERTIFICATE OF CORRECTION

PATENT NO. : 4,535,016

DATED : August 13, 1985

INVENTOR(S) : John M. Bradley

It is certified that error appears in the above-identified patent and that said Letters Patent are hereby corrected as shown below:

In claim 1, lines 6 - 7, change "said insulating material in said envelop; or metalloid oxide pigment intimately admixed with" to --or metalloid oxide pigment intimately admixed with said insulating material in said envelope;--

Signed and Sealed this

*Eighteenth* Day of *February 1986*

[SEAL]

*Attest:*

DONALD J. QUIGG

*Attesting Officer* *Commissioner of Patents and Trademarks*